(12) United States Patent
Momiuchi et al.

(10) Patent No.: US 6,816,519 B2
(45) Date of Patent: Nov. 9, 2004

(54) SOLID-STATE LASER DEVICE

(75) Inventors: Masayuki Momiuchi, Tokyo-to (JP);
Taizo Eno, Tokyo-to (JP); Yoshiaki Goto, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 10/361,363

(22) Filed: Feb. 10, 2003

(65) Prior Publication Data

US 2004/0095982 A1 May 20, 2004

(30) Foreign Application Priority Data

Nov. 19, 2002 (JP) ........................................ 2002-335782

(51) Int. Cl.[7] .............................. H01S 3/10; H01S 3/14; H01S 3/082
(52) U.S. Cl. .............................. 372/21; 372/22; 372/68; 372/97
(58) Field of Search .............................. 372/21, 22, 23, 372/68, 97, 20

(56) References Cited

U.S. PATENT DOCUMENTS

| | | | |
|---|---|---|---|
| 4,338,578 A | * | 7/1982 | Sukhman ..................... 372/23 |
| 5,345,457 A | * | 9/1994 | Zenzie et al. ................. 372/22 |
| 6,636,537 B2 | * | 10/2003 | Takada ........................ 372/23 |

* cited by examiner

*Primary Examiner*—Wilson Lee
*Assistant Examiner*—Armando Rodriguez
(74) *Attorney, Agent, or Firm*—Nields & Lemack (57) ABSTRACT

A solid-state laser device, comprising a first resonator arranged on a first optical axis, a second resonator arranged on a second optical axis, a first light emitter for entering an excitation light to the first resonator, a second light emitter for entering an excitation light to the second resonator, and further comprising a separated optical axis portion serving as a part of the first optical axis, a separated optical axis portion serving as a part of the second optical axis, a common optical axis portion where the first optical axis and the second optical axis are superimposed, a first solid-state laser medium arranged on the separated optical axis portion of the first optical axis, a second solid-state laser medium arranged on the separated optical portion of the second optical axis, and an optical member for wavelength conversion and wavelength switching means arranged on the common optical axis portion, wherein the optical member for wavelength conversion comprises a plurality of optical crystals for wavelength conversion having different conversion frequencies, and the wavelength switching means can change the optical crystals for wavelength conversion where a laser beam enters.

5 Claims, 7 Drawing Sheets

SOLID-STATE LASER DEVICE

BACKGROUND OF THE INVENTION

The present invention relates to a semiconductor laser device, in particular, to a solid-state laser device, and further relates to a solid-state laser device which is oscillated in two wavelengths by a resonator and converts the wavelength in the resonator.

A diode pumped solid-state laser is known, which uses intracavity type SHG mode to convert frequency of a laser beam from a fundamental frequency.

Figure 9:
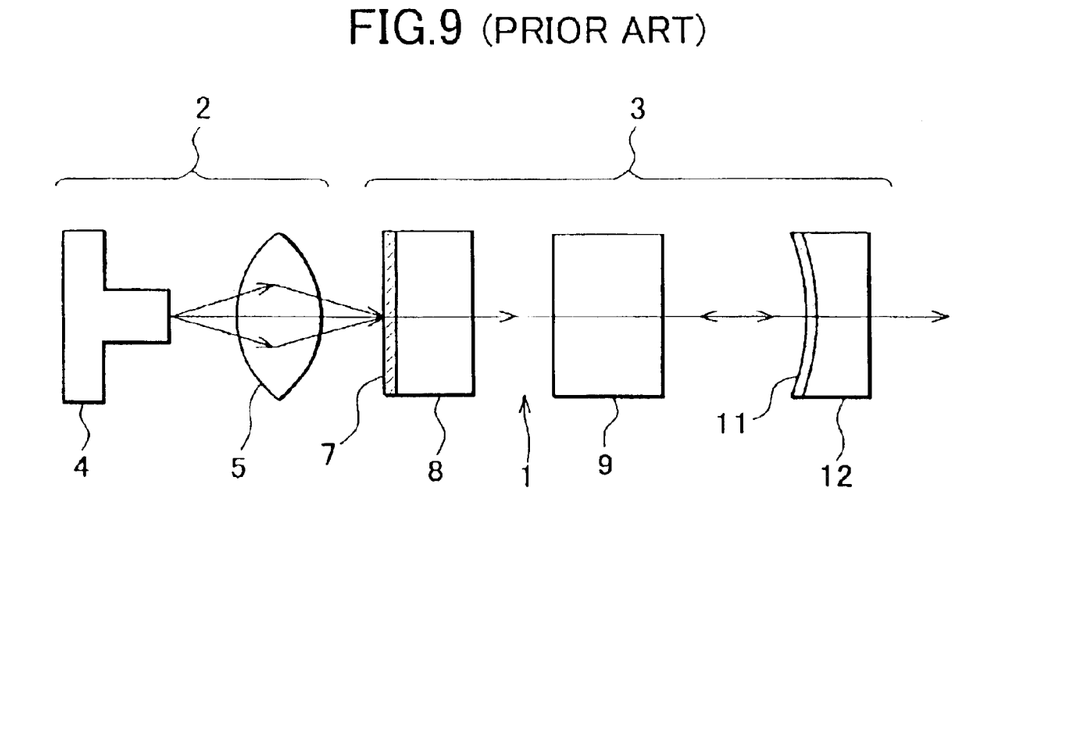
FIG. 9 is a schematical block diagram of a conventional type device.

Referring to FIG. 9, description will be given on general features of the diode pumped solid-state laser of one-wavelength oscillation.

In FIG. 9, reference numeral 2 denotes a light emitter, and 3 is an optical resonator. The light emitter 2 comprises an LD light emitter 4 and a condenser lens 5. Further, the optical resonator 3 comprises a laser crystal 8 where a dielectric reflection film 7 is formed, a nonlinear optical medium (NLO) 9, and a concave mirror 12 where a dielectric reflection film 11 is formed. A laser beam is pumped at the optical resonator 3, and the laser beam is outputted by resonation and amplification. As the laser crystal 8, Nd:YVO$_4$ may be used. As the nonlinear optical medium 9, KTP (KTiOPO$_4$; titanyl potassium phosphate) may be used.

Further description will be given below.

A laser light source 1 is used to emit a laser beam with a wavelength of 809 nm, for instance, and the LD light emitter 4, i.e. a semiconductor laser, is used. The LD light emitter 4 has the function as a pumping light generator for generating an excitation light. The laser light source 1 is not limited to the semiconductor laser, and any type of light source means can be adopted so far as it can emit a laser beam.

The laser crystal 8 is used for amplification of light. As the laser crystal 8, Nd:YVO$_4$ with an oscillation line of 1064 nm is used. In addition, YAG (yttrium aluminum garnet) doped with Nd$^{3+}$ ion or the like is adopted. YAG has oscillation lines of 946 nm, 1064 nm, 1319 nm, etc. Also, Ti (sapphire) with oscillation lines of 700–900 nm can be used.

On the LD light emitter 4 side of surfaces of the laser crystal 8, a first dielectric reflection film 7 is formed. The first dielectric reflection film 7 is highly transmissive to a laser beam from the LD light emitter 4 and is highly reflective to an oscillation wavelength of the laser crystal 8, and it is also highly reflective to SHG (second harmonic generation).

The concave mirror 12 is designed to face to the laser crystal 8. The laser crystal 8 side of surfaces of the concave mirror 12 is fabricated in form of a concaved spherical mirror having an adequate radius and a second dielectric reflection film 11 is formed on it. The second dielectric reflection film 11 is highly reflective to the oscillation wavelength of the laser crystal 8, and it is highly transmissive to SHG (second harmonic generation).

As described above, when the first dielectric reflection film 7 of the laser crystal 8 is composed with the second dielectric reflection film 11 of the concave mirror 12 and the laser beam from the LD light emitter 4 is pumped to the laser crystal 8 via the condenser lens 5, the light is reciprocally projected between the first dielectric reflection film 7 of the laser crystal 8 and the second dielectric reflection film 11. Thus, the light can be confined for longer time, and the light can be resonated and amplified.

The nonlinear optical medium 9 is inserted in the optical resonator, which comprises the first dielectric reflection film 7 of the laser crystal 8 and the concave mirror 12. When an intensive coherent light such as a laser beam enters the nonlinear optical medium 9, a second harmonic wave to double the light frequency is generated. The generation of the second harmonic wave is called "second harmonic generation (SHG)". As a result, a laser beam with a wavelength of 532 nm is emitted from the laser light source 1.

In the laser light source 1 as described above, the nonlinear optical medium 9 is inserted into the optical resonator, which comprises the first dielectric reflection film 7 of the laser crystal 8 and the concave mirror 12, and it is called an intracavity type SHG. Because conversion output is proportional to square of excited photoelectric power, there is such effect that high light intensity in the optical resonator can be directly utilized.

Further, a type of solid-state laser device is known, by which an entered laser beam of a fundamental frequency is oscillated to two different wavelengths and these are further converted to different frequencies by using sum frequency mixing (SFM) and differential frequency mixing (DFM).

Figure 10:
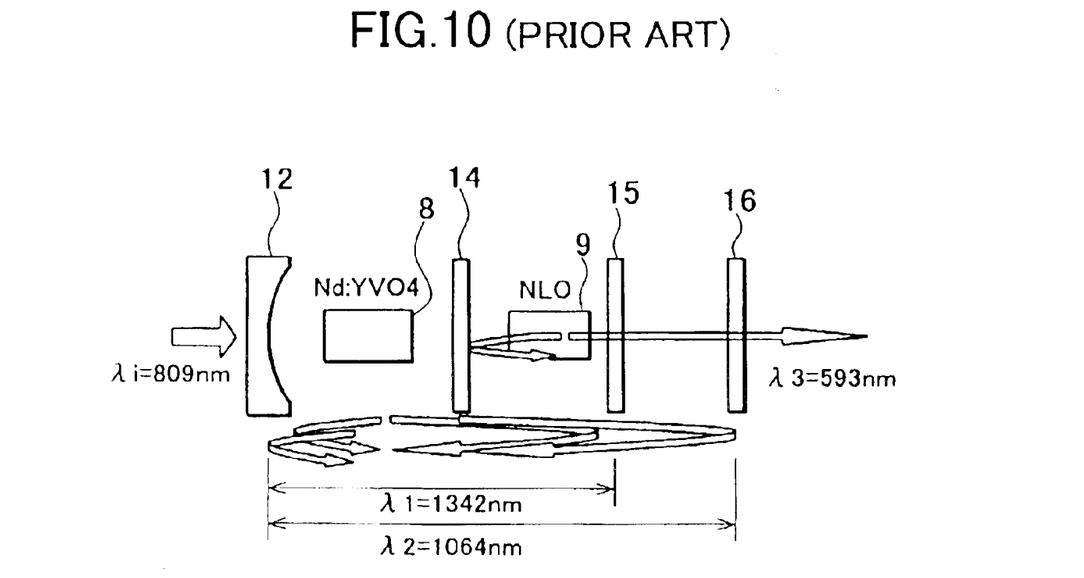
FIG. 10 is a schematical block diagram of another type of conventional device.

Description will be given on the solid-state laser device as described above referring to FIG. 10. In FIG. 10, the LD light emitter 4 and the condenser lens 5 are omitted.

As seen from the LD light emitter 4, there are arranged a concave mirror 12, a laser crystal 8, a first plane reflection mirror 14, a nonlinear optical medium 9, a second plane reflection mirror 15, and a third plane reflection mirror 16.

The concave mirror 12 is highly transmissive to a wavelength $\lambda i$ (809 nm in the figure), and it is highly reflective to a wavelength $\lambda 1$ (1342 nm in the figure) and a wavelength $\lambda 2$ (1064 nm in the figure). The first plane reflection mirror 14 is highly reflective to SFG (wavelength $\lambda 3$=593 nm in the figure) and is highly transmissive to the wavelengths $\lambda 1$ and $\lambda 2$. The second plane reflection mirror 15 is highly transmissive to the wavelengths $\lambda 3$ and $\lambda 2$, and it is highly reflective to the wavelength $\lambda 1$. The third plane reflection mirror 16 is highly transmissive to the wavelength $\lambda 3$ and is highly reflective to the wavelength $\lambda 2$.

The excitation light $\lambda i$ entered via the concave mirror 12 excites the laser crystal (Nd:YVO$_4$). Among the natural released light beams, the light beams with the wavelengths $\lambda 1$ and $\lambda 2$ are pumped and resonated between the concave mirror 12 and the second plane reflection mirror 15 and between the concave mirror 12 and the third plane reflection mirror 16. The wavelength of $\lambda 1$ is excited and amplified, and the wavelength of $\lambda 2$ is excited and amplified. Further, the laser beams with both wavelengths pass through the nonlinear optical medium 9. As a result, sum frequency $\lambda 3$ of both wavelengths can be obtained, and the laser beam passes through the third plane reflection mirror 16 and is projected.

In case of sum frequency mixing (SFM), there exists a relationship: $1/\lambda 3=1/\lambda 1+1/\lambda 2$. By selecting the nonlinear optical medium 9, differential frequency mixing (DFM) can be obtained. In this case, there exists a relationship: $1/\lambda 3=1/\lambda 1-1/\lambda 2$ (where $\lambda 1<\lambda 2$).

In the frequency conversion of the above described solid-state laser device for generating sum frequency mixing (SFM) and differential frequency mixing (DFM), it is advantageous in that wavelength conversion can be achieved with high efficiency by arranging the nonlinear optical medium 9 in the optical resonator.

A conventional type example as described above is written in, for instance, F. chen. and S. W. Tssi: Opt. Lett. 27 (2002), 397.

In the solid-state laser device shown in FIG. 10, sum frequency mixing (SFM) and differential frequency mixing (DFM) are generated, and frequency conversion is performed. It is advantageous in that wavelength conversion can be carried out with high efficiency, while it has the following disadvantages:

The laser beam, which can be inputted to the laser crystal 8, is under excitation input limitation at a breakdown threshold value of the crystal, and it is difficult to have high output.

In order to raise excitation efficiency, the fundamental wave with the wavelength λ1 is needed to be on the same optical axis as the fundamental wave with the wavelength λ2. Because the concave mirror 12, the second plane reflection mirror 15 and the third plane reflection mirror 16 are arranged on a common optical axis, it is difficult to perfectly match the two optical axes with the wavelengths of λ1 and λ2 by adjusting the concave mirror 12, the second plane reflection mirror 15 and the third plane reflection mirror 16.

Further, the nonlinear optical medium 9 must be arranged on a portion of the laser beam with higher energy density (beam waist) in order to have higher efficiency. The beam waist (ω) is obtained from the equation (1) given below, and the position is different if the wavelength λ is different. Therefore, as shown in FIG. 10, if the laser crystal 8 is provided commonly for the wavelengths λ1 and λ2, the nonlinear optical medium 9 cannot be placed at the positions of the beam waist of the wavelength λ1 and of the beam waist of the wavelength λ2, and conversion efficiency is decreased.

$$\omega=\sqrt{\{\lambda\sqrt{[L(R-L)]}/\pi\}} \quad (1)$$

where L denotes length of the resonator, provided neglecting, for simplification, crystal effects (thermal effects, optical path change, etc.), and R is curvature of the concave mirror.

Further, there are cases where a plurality of wavelengths are required for the laser beams emitted from the solid-state laser device. For instance, when the solid-state laser device is used in a system for ophthalmological treatment, etc., different wavelengths are required depending on treatment purpose. In the solid-state laser device as described above, the outputted laser beam has shorter wavelength and the device cannot cope with the application for the case where laser beams with a plurality of wavelengths are required.

SUMMARY OF THE INVENTION

It is an object of the present invention to provide a solid-state laser device, by which it is possible to obtain high output, to easily perform the matching of optical axes for two wavelengths, to carry out frequency conversion with high efficiency and to project laser beams with a plurality of wavelengths.

To attain the above object, the solid-state laser device according to the present invention comprises a first resonator arranged on a first optical axis, a second resonator arranged on a second optical axis, a first light emitter for entering an excitation light to the first resonator, a second light emitter for entering an excitation light to the second resonator, and further comprising a separated optical axis portion serving as a part of the first optical axis, a separated optical axis portion serving as a part of the second optical axis, a common optical axis portion where the first optical axis and the second optical axis are superimposed, a first solid-state laser medium arranged on the separated optical axis portion of the first optical axis, a second solid-state laser medium arranged on the separated optical portion of the second optical axis, and an optical member for wavelength conversion and wavelength switching means arranged on the common optical axis portion, wherein the optical member for wavelength conversion comprises a plurality of optical crystals for wavelength conversion having different conversion frequencies, and the wavelength switching means can change the optical crystals for wavelength conversion where a laser beam enters. Also, the present invention provides the solid-state laser device as described above, wherein the first resonator and the second resonator have concave mirrors and a plane mirror, the concave mirrors are arranged on separated optical axis portions respectively, and the plane mirror is provided on a common optical axis portion. Further, the present invention provides the solid-state laser device as described above, wherein the first light emitter for entering the excitation light to the first resonator and the second light emitter for entering the excitation light to the second resonator can be driven independently from each other. Also, the present invention provides the solid-state laser device as described above, wherein the first solid-state laser medium and the second solid-state laser medium are provided on converging points of the excitation light on the separated optical axis portions of the first resonator and the second resonator respectively. Further, the present invention provides the solid-state laser device as described above, wherein the optical member for wavelength conversion is provided on beam waist portion of the common optical axis portion.

DETAILED DESCRIPTION OF THE PREFERRED EMBODIMENTS

Description will be given below on embodiments of the present invention referring to the drawings.

Figure 1:
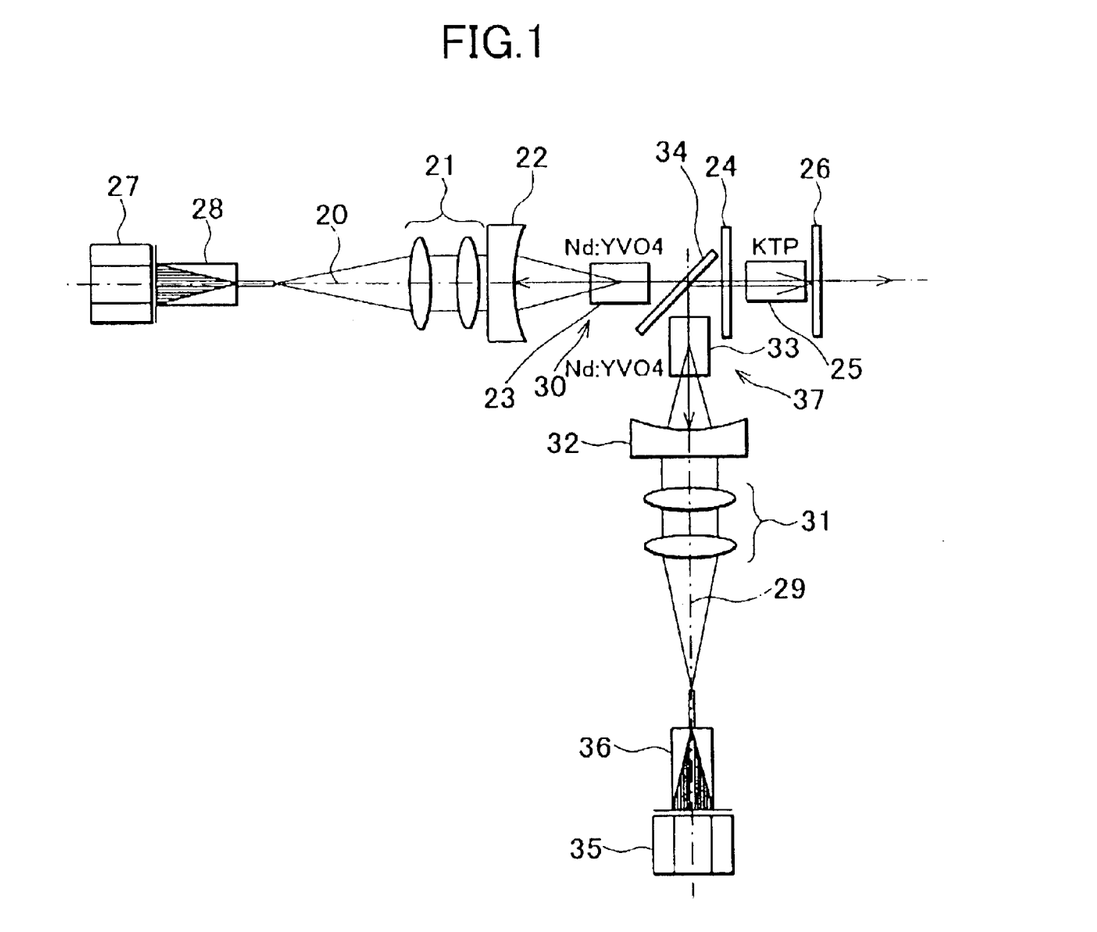
FIG. 1 is a schematical block diagram of a first embodiment of the present invention.
Figure 2:
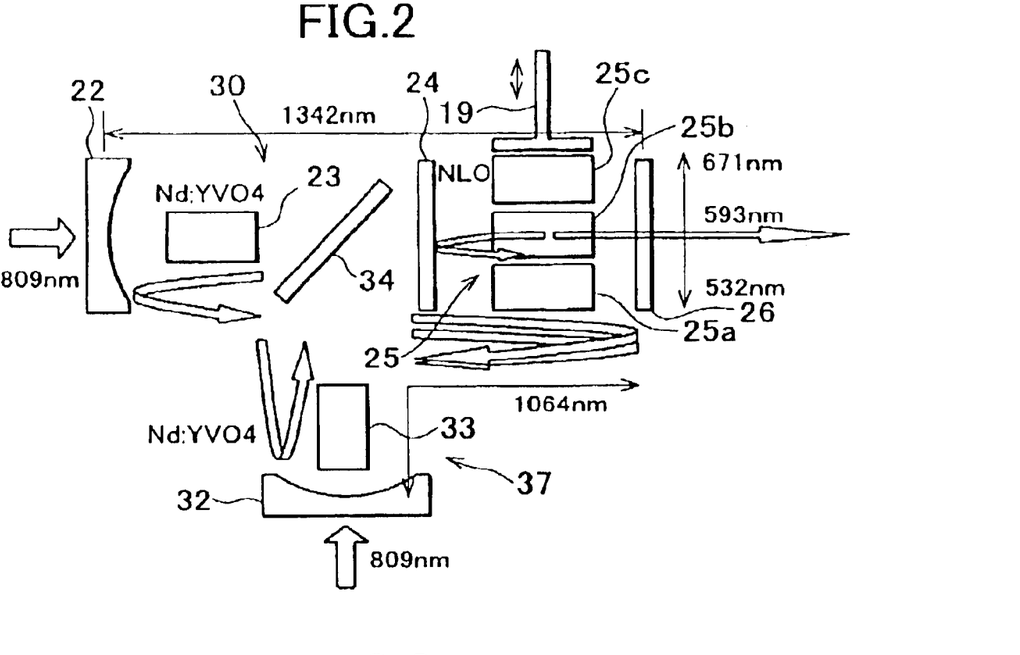
FIG. 2 is a schematical block diagram of an essential portion of the first embodiment of the present invention.

FIG. 1 and FIG. 2 show a first embodiment of the present invention. A first condenser lens unit 21, a first concave mirror 22, a first solid-state laser medium (a first laser crystal) 23, an intermediate mirror 24, a nonlinear optical medium (optical crystal for wavelength conversion) 25, and an output mirror 26 are arranged on a first optical axis 20. An LD light emitter 27 is disposed at a position opposite to the first condenser lens unit 21, and the LD light emitter 27 has a predetermined number of LDs arranged in one row. Laser beams emitted from individual LDs are bundled together by bundling optical fibers 28, and the beams are entered to the first condenser lens unit 21 as a combined laser beam.

Between the first solid-state laser medium 23 and the intermediate mirror 24 and along a second optical axis 29, which crosses the first optical axis 20 at an angle of 90° for instance, there are arranged a second condenser lens unit 31, a second concave mirror 32, and a second solid-state laser medium (a second laser crystal) 33. A wavelength separating plate 34 is arranged at a position where the first optical axis 20 crosses the second optical axis 29. The second optical axis 29 is deflected by the wavelength separating plate 34, and the second optical axis 29 uses a portion between the wavelength separating plate 34 and the output mirror 26 in common with the first optical axis 20. The optical crystal 25 for wavelength conversion is arranged on the optical axis portion, which is commonly used by the first optical axis 20 and the second optical axis 29.

An LD light emitter 35 is arranged at a position opposite to the second condenser lens unit 31, and the LD light emitter 35 has a predetermined number of LDs arranged in one row. Laser beams emitted from individual LDs are bundled together by bundling optical fibers 36, and the laser beams are entered into the second condenser lens unit 31 as a combined laser beam.

The first concave mirror 22 is highly transmissive to a wavelength λ which is an excitation light, and it is highly reflective to wavelength λ1 of a first fundamental wave. The intermediate mirror 24 is highly transmissive to the wavelength λ1 and to a wavelength λ2 of a second fundamental wave, and it is highly reflective to a wavelength λ3 of wavelength conversion light [(sum frequency mixing (SFM) or differential frequency mixing (DFM) or SHG1 (λ1/2), or SHG2 (λ2/2)]. The output mirror 26 is highly reflective to the wavelengths λ1 and λ2, and it is highly transmissive to the wavelength λ3 of the wavelength conversion light [(sum frequency mixing (SFM) or differential frequency mixing (DFM) or SHG1 (λ1/2), or SHG2 (λ2/2)]. Hereinafter, description will be given on sum frequency mixing (SFM).

The second concave mirror 32 is highly transmissive to excitation light with wave λ, and it is highly reflective to the second fundamental wave λ2. The wavelength separating plate 34 is highly transmissive to the first fundamental wave λ1, and it is highly reflective to the second fundamental wave λ2. The components between the first concave mirror 22 and the output mirror 26 make up together a first resonator 30 for the first fundamental wave. The components between the second concave mirror 32 and the output mirror 26 make up together a second resonator 37 for the second fundamental wave.

A distance L1 between a reflection surface of the first concave mirror 22 and a reflection surface of the output mirror 26 and a distance L2 between a reflection surface of the second concave mirror 32 and a reflection surface of the output mirror 26 are set in such manner that beam waist ω1 of the first resonator 30 and beam waist ω2 of the second resonator 37 are approximately equal to each other.

From the equation (1):

$$\omega 1^2 = \lambda 1 \sqrt{L1(R1-L1)}/\pi$$

$$\omega 2^2 = \lambda 2 \sqrt{L2(R2-L2)}/\pi$$

If it is assumed that ω1 and ω2 are approximately equal to each other, $$\lambda 1^2 L1(R1-L1) = \lambda 2^2 L2(R2-L2)$$

(where R1 and R2 each represents radius of curvature of the concave mirrors 22 and 32 respectively).

In the arrangement as described above, the LD light emitter 27 and the LD light emitter 35 emit wavelength λ=809 nm as excitation light, and Nd:YVO4 having oscillation lines of 1342 nm and 1064 nm is used as the first solid-state laser medium 23 and the second solid-state laser medium 33 respectively. In this case, KTP (KTiOPO4; titanyl potassium phosphate) is used as the optical crystal 25 for wavelength conversion.

The optical member 25 for wavelength conversion comprises a plurality of optical crystals 25a, 25b, and 25c (three types are shown in FIG. 2) for wavelength conversion. These are processed with angle adjustment for sum frequency mixing SFM (or differential frequency mixing DFM), SHG1 (λ1/2), or SHG2 (λ2/2) respectively.

The optical member 25 for wavelength conversion is supported by a wavelength switching means 19, and the wavelength switching means 19 can displace the optical member 25 for wavelength conversion in a direction perpendicular to the common optical axis portion. The optical crystal 25a for wavelength conversion, the optical crystal 25b for wavelength conversion, and the optical crystal 25c for wavelength conversion can be separately positioned on the common optical axis portion.

It may be designed in such manner that the wavelength switching means 19 can optically switch over the optical path.

First, description will be given on a condition where the optical crystal 25a for wavelength conversion to convert sum frequency is inserted in the common optical axis portion.

The laser beams emitted from the LD light emitter 27 pass through the optical fibers 28 and are converged into the solid-state laser medium 23 via the first condenser lens unit 21, and a laser beam of a first fundamental wave λ1=1342 nm is oscillated between the first concave mirror 22 and the output mirror 26. Also, the laser beams emitted from the LD light emitter 35 pass through the optical fibers 36 and are converged into the second solid-state laser medium 33 by the second condenser lens unit 31. After being reflected by the wavelength separating plate 34, a laser beam of a second fundamental wave λ2=1064 nm is oscillated between the second concave mirror 32 and the output mirror 26.

Further, when the laser beams with the first fundamental wave λ1 and the second fundamental wave λ2 pass through the optical crystal 25a for wavelength conversion, sum frequency of 593 nm is generated. A laser beam with a wavelength of 593 nm directed to the intermediate mirror 24 is reflected by the intermediate mirror 24 and is turned to a laser beam with the wavelength 593 nm by the output mirror 26 and is projected.

In the arrangement of the solid-state laser device as described above, the first resonator 30 and the second resonator 37 are arranged separately except the intermediate mirror 24, the optical crystal 25a for wavelength conversion and the output mirror 26. Thus, the laser beam projected from the LD light emitter 27 to the first resonator 30 forms a converging point between the first concave mirror 22 and the wavelength separating plate 34 in the figure, and this converging point is positioned within or closer to the first solid-state laser medium 23. Similarly, the laser beam projected from the LD light emitter 32 to the second resonator 37 forms a converging point between the second concave mirror 32 and the wavelength separating plate 34 in the figure, and this converging point is positioned within or closer to the second solid-state laser medium 33.

Excitation efficiency of the first solid-state laser medium 23 and the second solid-state laser medium 33 is influenced by an energy density or a direction of polarization of the laser beam. Because the positions of the first solid-state laser medium 23 and the second solid-state laser medium 33 can be separately adjusted, these can be set at optimal positions. The direction of polarization can be adjusted separately for each of the LD light emitter 27 and the LD light emitter 35, and adjustment can be made in easy manner. In the positional adjustment of the optical members, e.g. in the matching of optical axes of the first concave mirror 22 and the second concave mirror 32, the adjustment of one of the first concave mirror 22 or the second concave mirror 32 does not exert influence on the adjustment of another concave mirror. Thus, after the adjustment has been completed on one of the first concave mirror 22 or the second concave mirror 32, the adjustment of the other concave mirror can be carried out, and this makes the adjustment much easier. Further, the directions of polarization of two fundamental lights can be made parallel to each other or can be crossed perpendicularly to each other. As a result, there is no restriction on the optical member 25 for wavelength conversion, and all types of optical crystal for wavelength conversion can be used.

Also, it is possible to design in such manner that common portions of the first optical axis 20 and the second optical axis 29 perfectly concur with each other. By making them perfectly concur with each other, conversion efficiency of the optical crystal 25a for wavelength conversion is improved.

Also, it may be designed in such manner that the first resonator and the second resonator are oscillated with the same wavelength ($\lambda 1 = \lambda 2$). In this case, a polarization separating plate (P/S) is used as the wavelength separating plate 34. Oscillation wavelength will be 1064 nm (green at 532 nm) in case of Nd:YAG, for instance.

Under the arrangement as described above, only the laser beam from the LD light emitter 27 is projected to the first solid-state laser medium 23, and only the laser beam from the LD light emitter 35 is projected to the second solid-state laser medium 33. Accordingly, the load applied on the first solid-state laser medium 23 and the second solid-state laser medium 33 are low, and a wavelength conversion light is obtained from the laser beams from two sets of light emitters, i.e. the LD light emitter 27 and the LD light emitter 35. Thus, high output can be achieved.

Next, description will be given on a case where the optical crystal 25b for wavelength conversion is placed into the common optical axis portion by the wavelength switching means 19, and a laser beam of 671 nm is projected as SHG1 ($\lambda 1/2$).

The operation of the LD light emitter 35 is stopped, and only the excitation light $\lambda$ from the LD light emitter 27 is entered. In this case, only the first resonator 30 is in operation. The fundamental wave $\lambda 1$ is converted in wavelength to SHG1 ($\lambda 1/2$) by the optical crystal 25b for wavelength conversion and is emitted.

Also, description will be given below on a case where the optical crystal 25c for wavelength conversion is inserted into the common optical axis portion by the wavelength switching means 19, and a laser beam of 532 nm is entered as SHG2 ($\lambda 2/2$).

The operation of the LD light emitter 27 is stopped, and only the excitation light $\lambda$ from the LD light emitter 35 is entered. In this case, only the second resonator 37 is in operation. The fundamental wave $\lambda 2$ is converted in wavelength to SHG2 ($\lambda 2/2$) by the optical crystal 25c for wavelength conversion and is emitted.

By selecting the optical crystals 25a, 25b, and 25c for wavelength conversion and by controlling the driving of the LD light emitter 27 and the LD light emitter 35, laser beams with three different wavelengths can be projected.

As the optical member 25 for wavelength conversion, BBO ($\beta$-BaB$_2$O$_4$; $\beta$-lithium borate), LBO (LiB$_3$O$_5$; lithium triborate), KNbO$_3$ (potassium niobate), etc. may be used in addition to KTP.

It may be designed that the intermediate mirror 24 and the output mirror 26 are omitted. On a left end surface of the optical crystal 25a for wavelength conversion as shown in FIG. 2, a reflection film is formed, which is highly transmissive to the wavelength $\lambda 1$ of the first fundamental wave and $\lambda 2$ of the second fundamental wave and is highly reflective to sum frequency of 593 nm. On a right end surface of the optical crystal 25a for wavelength conversion, a reflection film is formed, which is highly reflective to the wavelengths $\lambda 1$ and $\lambda 2$ and is highly transmissive to $\lambda 3$ of the sum frequency (593 nm) of the wavelength conversion light.

On a left end surface of the optical crystal 25b for wavelength conversion, a reflection film is formed, which is highly transmissive to the wavelengths $\lambda 1$ and $\lambda 2$ and is highly reflective to SHG1 of 671 nm. On a right end surface of the optical crystal 25b for wavelength conversion, a reflection film is formed, which is highly reflective to the wavelengths $\lambda 1$ and $\lambda 2$ and is highly transmissive to the wavelength $\lambda 3$ of SHG1 (671 nm).

On a left end surface of the optical crystal 25c for wavelength conversion, a reflection film is formed, which is highly transmissive to the wavelengths $\lambda 1$ and $\lambda 2$ and is highly reflective to SHG2 of 532 nm. Also, it is may be designed in such manner that, on a right end surface of the optical crystal 25c for wavelength conversion, a reflection film is formed, which is highly reflective to the wavelengths $\lambda 1$ and $\lambda 2$ and is highly transmissive to the wavelength $\lambda 3$ of SHG2 (532 nm).

By forming the reflection films on both end surfaces of the optical crystals 25a, 25b, and 25c for wavelength conversion, it is possible to omit the intermediate mirror 24 and the output mirror 26, and this makes it possible to design the device in more compact size.

Figure 3:
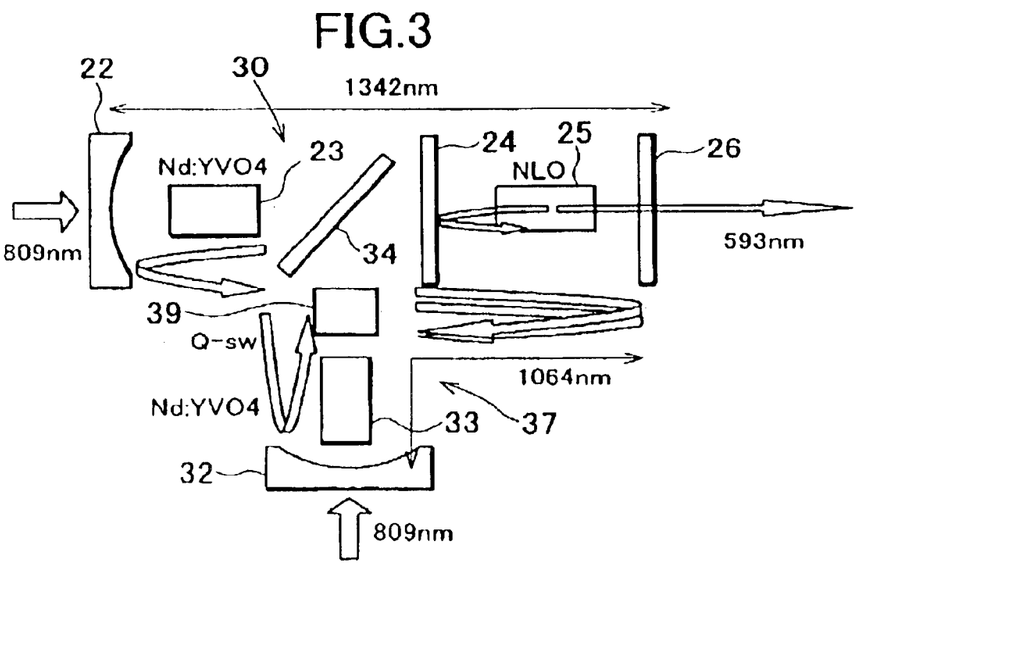
FIG. 3 is a schematical block diagram of an essential portion of a second embodiment of the present invention.

FIG. 3 shows a second embodiment of the present invention. In FIG. 3, the same component as shown in FIG. 1 and in FIG. 2 is referred by the same symbol.

A Q-sw 39 is arranged between the second solid-state laser medium 33 and the wavelength separating plate 34 of the second resonator 37. The Q-sw 39 comprises a saturable absorber (crystal). The Q-sw absorbs the incident laser beam under saturable condition. When an amount of absorption exceeds a predetermined level, the laser beam is emitted. Thus, the Q-sw 39 carries out switching action. As a result, the laser beam emitted from the solid-state laser device is emitted in pulsed state by the switching action of the Q-sw 39.

As the material of the Q-sw 39, Cr:YAG, semiconductor, etc., may be used, and AO (acoustooptic), EO (electrooptic) Q-sws also may be used.

Normally, on a crystal end surface of a laser crystal, concave mirror action occurs due to thermal lens effect caused by excitation. Therefore, it may be designed in such manner that the first concave mirror 22 and the second concave mirror 32 are omitted, and that reflection surfaces for resonator may be formed on an end surface on the LD light emitter 27 side of the first solid-state laser medium 23 and on an end surface on the LD light emitter 35 side of the second solid-state laser medium 33.

Figure 4:
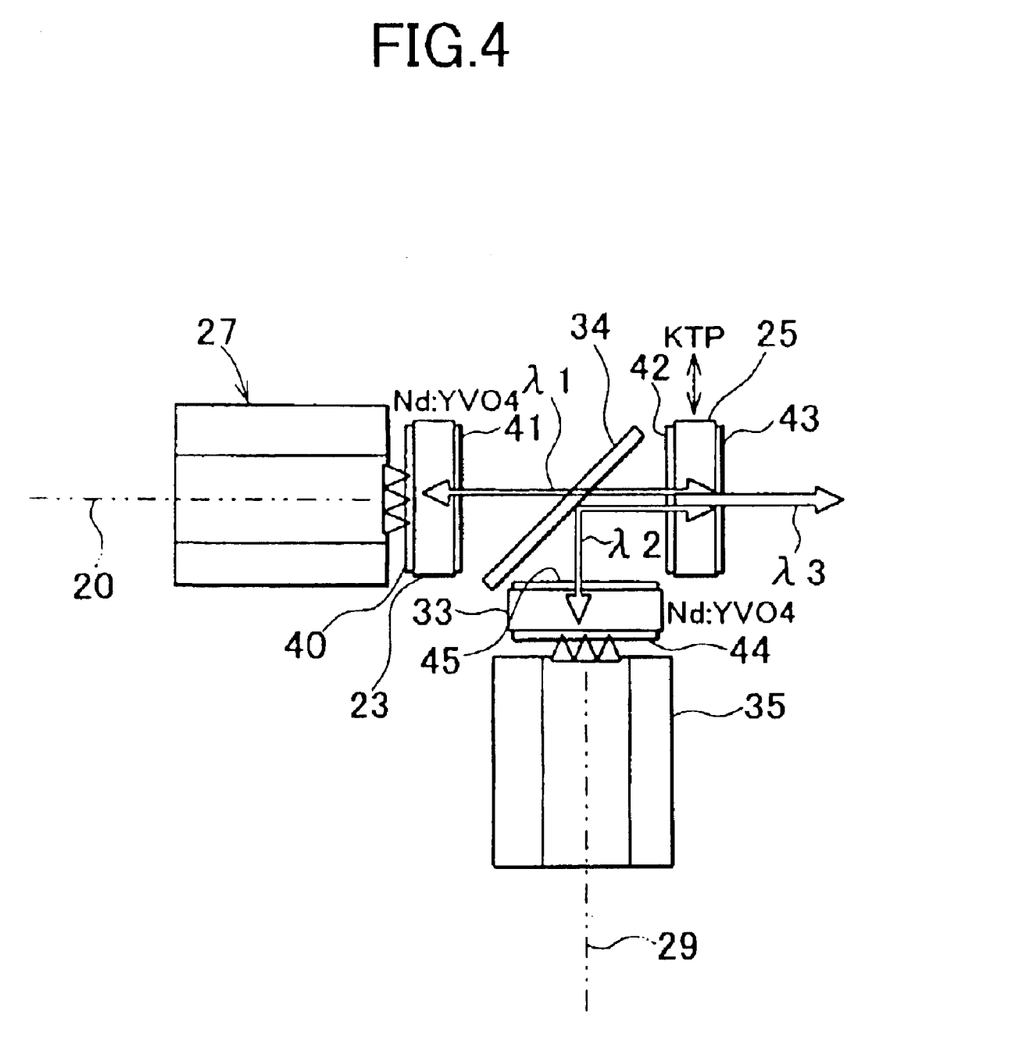
FIG. 4 is a schematical block diagram of an essential portion of a third embodiment of the present invention.

In a third embodiment of the present invention shown in FIG. 4, the first concave mirror 22, the second concave mirror 32, the intermediate mirror 24, and the output mirror 26 in the above embodiment are omitted.

The first solid-state laser medium 23 is arranged opposite to the LD light emitter 27 on the first optical axis 20, and the optical member 25 for wavelength conversion is placed at such a position as to have the wavelength separating plate 34 between the first solid-state laser medium 23 and the optical crystal 25. The optical member 25 for wavelength conversion comprises the optical crystal 25a for wavelength conversion, the optical crystal 25b for wavelength conversion, and the optical crystal 25c for wavelength conversion all continuously arranged in a direction perpendicular to the first optical axis 20. The LD light emitter 27 and the first solid-state laser medium 23 are arranged on the first optical axis 20, and the optical member 25 for wavelength conversion is arranged on a portion commonly used by the first optical axis 20 and the second optical axis 29 as described later.

On a surface of the first solid-state laser medium 23 facing to the LD light emitter 27, a dielectric reflection film 40 is formed, which is highly transmissive to the excitation light $\lambda$ and is highly reflective to the first fundamental wave $\lambda 1$. On a surface opposite to the facing surface of the first solid-state laser medium 23, a film 41 is formed, which is highly transmissive to the first fundamental wave 11. The wavelength separating plate 34 is highly transmissive to the first fundamental wave $\lambda 1$ and is highly reflective to the second fundamental wave $\lambda 2$.

On a surface on the LD light emitter 27 side of the optical member 25 for wavelength conversion, a dielectric reflection film 42 is formed, which is highly transmissive to the first fundamental wave $\lambda 1$ and is highly reflective to the wavelength conversion light $\lambda 3$. On a surface opposite to the surface on the LD light emitter 27 side of the optical member 25 for wavelength conversion, a dielectric reflection film 43 is formed, which is highly reflective to the first fundamental wave $\lambda 1$ and is highly transmissive to the wavelength conversion light $\lambda 3$.

The wavelength separating plate 34 is arranged on the second optical axis 29, which crosses the first optical axis 20, and there are provided the second solid-state laser medium 33 and the LD light emitter 35 facing toward the wavelength separating plate 34. On a surface facing toward the LD light emitter 35 of the second solid-state laser medium 33, a dielectric reflection film 44 is formed, which is highly transmissive to the excitation light $\lambda$ and is highly reflective to the second fundamental wave $\lambda 2$. On a surface opposite to the facing surface of the second solid-state laser medium 33 on an opposite side of the LD light emitter 35, a film 45 is formed, which is highly transmissive to the second fundamental wave $\lambda 2$.

The first resonator is made up between the dielectric reflection film 40 and the dielectric reflection film 43. The second resonator is made up between the dielectric reflection film 44 and the dielectric reflection film 43. The optical crystal 25a for wavelength conversion, the optical crystal 25b for wavelength conversion, and the optical crystal 25c for wavelength conversion of the optical member 25 for wavelength conversion are selectively inserted into the common optical axis portion.

The operation of the third embodiment is the same as the operation of the first embodiment explained in connection with FIG. 1 and FIG. 2, and description is not given here. In the third embodiment, the first concave mirror 22, the second concave mirror 32, the intermediate mirror 24, and the output mirror 26 are omitted, and the solid-state laser device can be designed in more compact size.

FIG. 4 shows a fourth embodiment, which uses the third embodiment.

Figure 5:
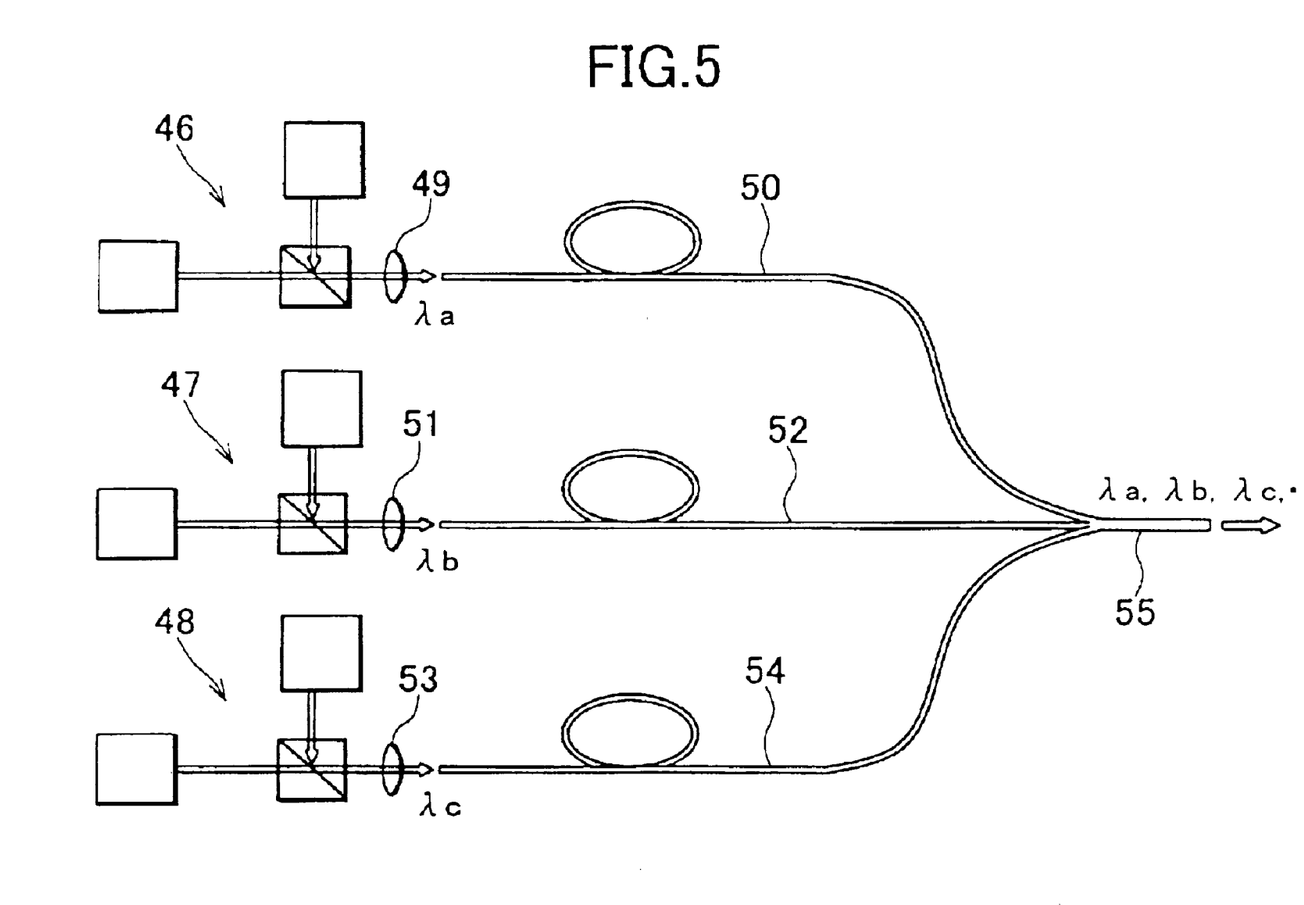
FIG. 5 is a schematical block diagram of a fourth embodiment of the present invention.

In the figure, reference numerals 46, 47, and 48 each represents a laser beam emitting unit. The arrangement is equivalent to the arrangement in the solid-state laser device shown in FIG. 4. The emitted laser beams have wavelengths of $\lambda a$, $\lambda b$, and $\lambda c$ respectively.

The wavelengths $\lambda a$, $\lambda b$, and $\lambda c$ of the laser beams can have the wavelength as required respectively depending on the selection of the excitation light $\lambda$ and depending on adequate selection of the first solid-state laser medium 23 and the optical member 25 for wavelength conversion.

A laser beam emitted from a first laser beam emitting unit 46 is converged by a condenser lens 49 and enters an optical fiber 50. A laser beam emitted from a second laser beam emitting unit 47 is converged by a condenser lens 51 and enters an optical fiber 52. A laser beam emitted from a third laser beam emitting unit 48 is converged by a condenser lens 53 and enters an optical fiber 54. Output portions 55 of the optical fibers 50, 52, and 54 are welded together for a predetermined length, and the laser beams with wavelengths of $\lambda a$, $\lambda b$, and $\lambda c$ are combined together, and these beams are emitted from the output portion 55 as the laser beams having the same optical axis.

When the first laser beam emitting unit 46, the second laser beam emitting unit 47, and the third laser beam emitting unit 48 are all driven, the laser beam emitted from the output portion 55 has a mixed color of the wavelengths $\lambda a$, $\lambda b$, and $\lambda c$. When any one unit, e.g. when only the first laser beam emitting unit 46, is driven, the laser beam has a single color of wavelength $\lambda a$. Further, the laser beam emitting units 46, 47, and 48 can project laser beams in three colors independently. Thus, multi-color laser beams can be projected.

In the fourth embodiment, a plurality of wavelengths can be projected efficiently and on the same optical axis, and it can be utilized as a light source of a projector, for instance.

In the fourth embodiment, an optical fiber is used as the means to combine the laser beams on the same optical axis, while a mirror may be used, which separately reflects or separately transmits the wavelengths.

Figure 6:
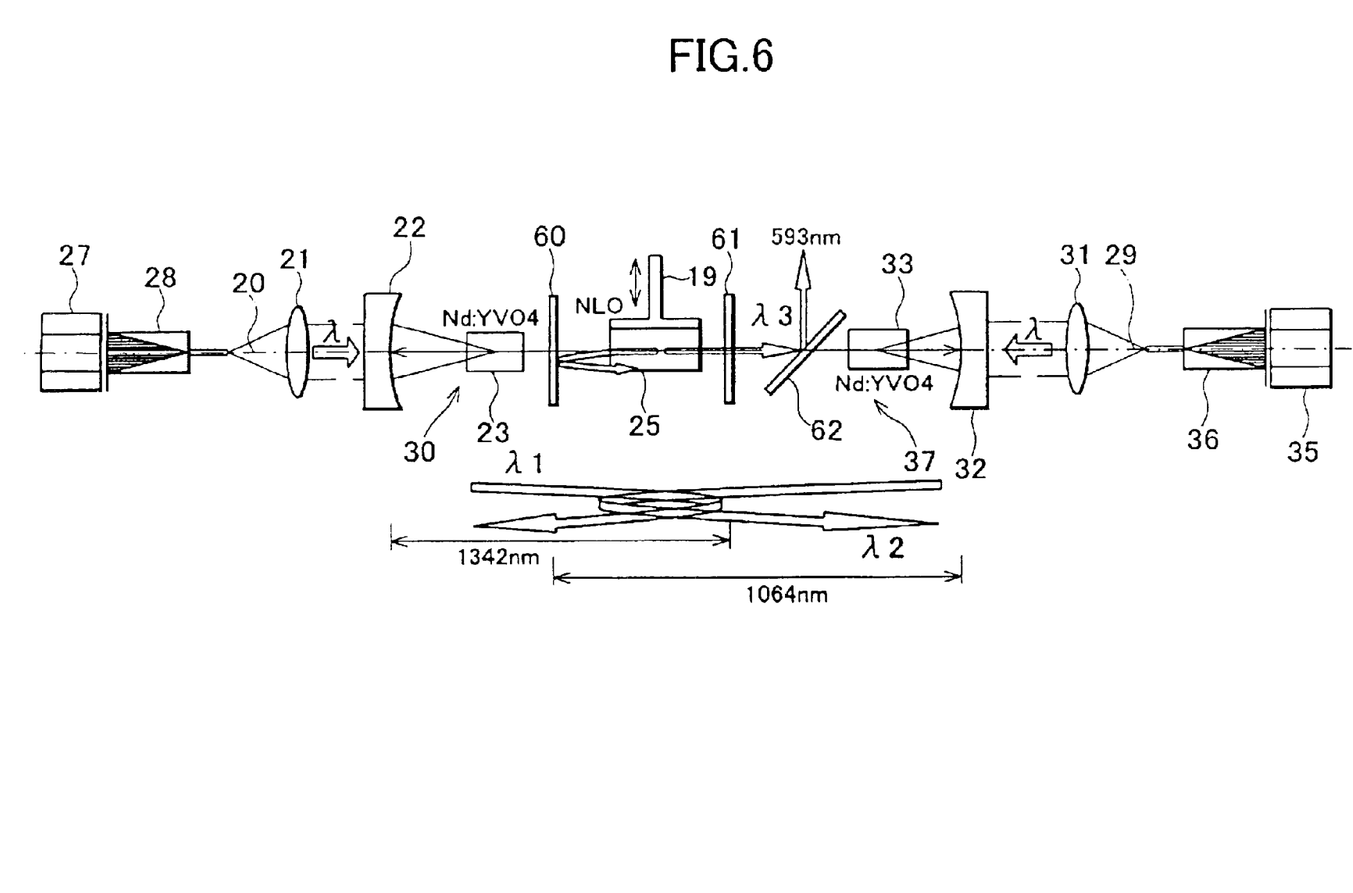
FIG. 6 is a schematical block diagram of a fifth embodiment of the present invention.

FIG. 6 shows a fifth embodiment of the present invention.

In FIG. 6, the same component as shown in FIG. 1 is referred by the same symbol.

In the first embodiment shown in FIG. 1, the first resonator 30 and the second resonator 37 are composed in T-shaped arrangement, while these are composed in linear arrangement in the fifth embodiment.

A first concave mirror 22, a first solid-state laser medium 23, a reflection mirror 60 for the second resonator, an optical member 25 for wavelength conversion, a reflection mirror 61 for the first resonator, a wavelength separating plate 62 for output, a second solid-state laser medium 33, and a second concave mirror 32 are arranged on the same optical axis. A first resonator 30 is made up between the first concave mirror 22 and the reflection mirror 61 for the first resonator, and a second resonator 37 is made up between the second concave mirror 32 and the reflection mirror 60 for the second resonator. The first optical axis 20 and the second optical axis 29 share a common optical axis portion between the reflection mirror 60 for the second resonator and the reflection mirror 61 for the first resonator.

An LD light emitter 27 is positioned to face toward a first condenser lens unit 21, and the LD light emitter 27 has a predetermined number of LDs arranged in one row. Laser beams emitted from each LD are bundled together by bundling optical fibers 28 and are entered to the first condenser lens unit 21 as a combined laser beam.

An LD light emitter 35 is positioned to face toward a second condenser lens unit 31, and the LD light emitter 35 has a predetermined number of LDs arranged in one row. Laser beams emitted from each individual LD are bundled together by bundling optical fibers 36 and are entered to the second condenser lens unit 31 as a combined laser beam.

The first concave mirror 22 is highly transmissive to an excitation light $\lambda$ and is highly reflective to a first fundamental wave $\lambda 1$. The reflection mirror 60 for the second resonator is highly transmissive to the fundamental wave $\lambda 1$ and is highly reflective to a second fundamental wave $\lambda 2$. It is also highly reflective to a wavelength conversion light $\lambda 3$ [sum frequency mixing (SFM) or differential frequency mixing (DFM); Hereinafter, description will be given on sum frequency mixing (SFM).]. The reflection mirror 61 for the first resonator is highly reflective to the first fundamental wave $\lambda 1$ and is highly transmissive to the second fundamental wave $\lambda 2$ and to the wavelength conversion light $\lambda 3$.

The wavelength separating plate 62 for output is highly transmissive to the first fundamental wave $\lambda 1$ and the second fundamental wave $\lambda 2$ and is highly reflective to the wavelength conversion light $\lambda 3$. The second concave mirror 32 is highly transmissive to the excitation light $\lambda$ and it is highly reflective to the second fundamental wave $\lambda 2$.

In the above arrangement, the LD light emitter 27 and the LD light emitter 35 each emits $\lambda$=809 nm as excitation light. Nd:YVO$_4$ having oscillation lines of 1342 nm and 1064 nm is used as the first solid-state laser medium 23 and the second solid-state laser medium 33. KTP is used as the optical member 25 for wavelength conversion.

The optical member 25 for wavelength conversion is supported by a wavelength switching means 19. The wavelength switching means 19 can displace the optical member 25 for wavelength conversion in a direction perpendicular to the common optical axis portion. An optical crystal 25a for wavelength conversion, and an optical crystal 25b for wavelength conversion, and an optical crystal 25c for wavelength conversion can be separately positioned on the common optical axis portion.

A distance L1 between a reflection surface of the first concave mirror 22 and a reflection surface of the reflection mirror 61 for the first resonator and a distance L2 between a reflection surface of the second concave mirror 32 and a reflection surface of the reflection mirror 60 for the second resonator are set in such manner that beam waist $\omega 1$ of the first resonator and beam waist $\omega 2$ for the second resonator will be approximately equal to each other.

From the equation (1):

$$\lambda 1^2 L1(R1-L1)=\lambda 2^2 L2(R2-L2) \qquad (2)$$

where R1 and R2 each represents radius of curvature of the concave mirrors 22 and 32 respectively.

By selecting the optical crystal 25a for wavelength conversion, the optical crystal 25b for wavelength conversion, and the optical crystal 25c for wavelength conversion and by combining the selection of driving of the LD light emitter 27 and the LD light emitter 35, a laser beam of sum frequency mixing 593 nm, a laser beam of SHG1 ($\lambda 1/2$) with wavelength of 671 nm, and a laser beam of SHG2 ($\lambda 2/2$) with wavelength of 532 nm are reflected by the wavelength separating plate 64 for output and are outputted.

In the solid-state laser device as described above, the first resonator 30 and the second resonator 37 are optically separated other than the optical member 25 for wavelength conversion. As a result, the laser beam projected from the LD light emitter 27 into the first resonator 30 form a converging point between the first concave mirror 22 and the reflection mirror 60 for the second resonator in the figure, and this converging point is positioned within or closer to the first solid-state laser medium 23. Similarly, the laser beam projected from the LD light emitter 35 to the second resonator 37 form a converging point between the second concave mirror 32 and the wavelength separating plate 62 for output in the figure, and it is positioned within or closer to the second solid-state laser medium 33.

The positions of the first solid-state laser medium 23 and the second solid-state laser medium 33 can be adjusted independently, and these can be set at optimal positions. Also, the direction of polarization can be adjusted independently for the LD light emitter 27 and the LD light emitter 35 respectively, and adjustment can be made in easy manner. Further, in positional adjustment of the optical members, e.g., in the matching of optical axes of the first concave mirror 22 and the second concave mirror 32, the adjustment of one of the first concave mirror 22 and the second concave mirror 32 exerts no influence on the adjustment of the other concave mirror. Thus, after the adjustment for one of the first concave mirror 22 and the second concave mirror 32 has been completed, the other concave mirror can be adjusted, and this makes the adjustment much easier. Further, two excitation lights can be polarized in parallel or perpendicular to each other. Accordingly, there is no limitation to the optical crystal for wavelength conversion, and any type of optical crystal for wavelength conversion can be used.

In the present embodiment, it is also possible to design that the common portion of the first optical axis 20 and the second optical axis 29 can perfectly concur with each other. By making them perfectly concur with each other, conversion efficiency of the optical crystal for wavelength conversion can be improved.

Figure 7:
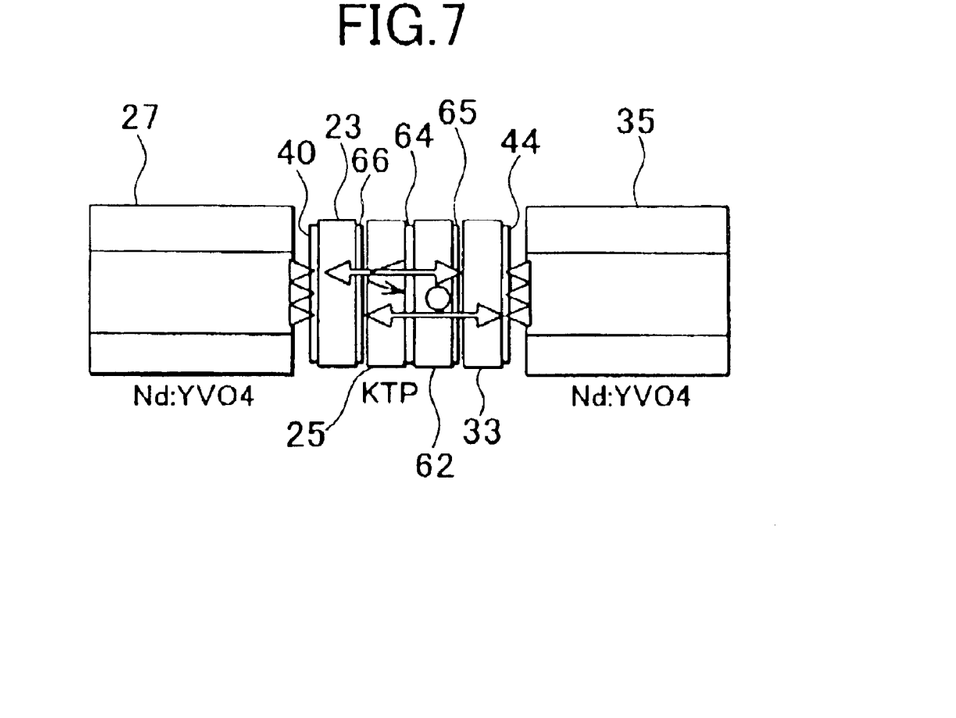
FIG. 7 is a schematical plan view of a sixth embodiment of the present invention.
Figure 8:
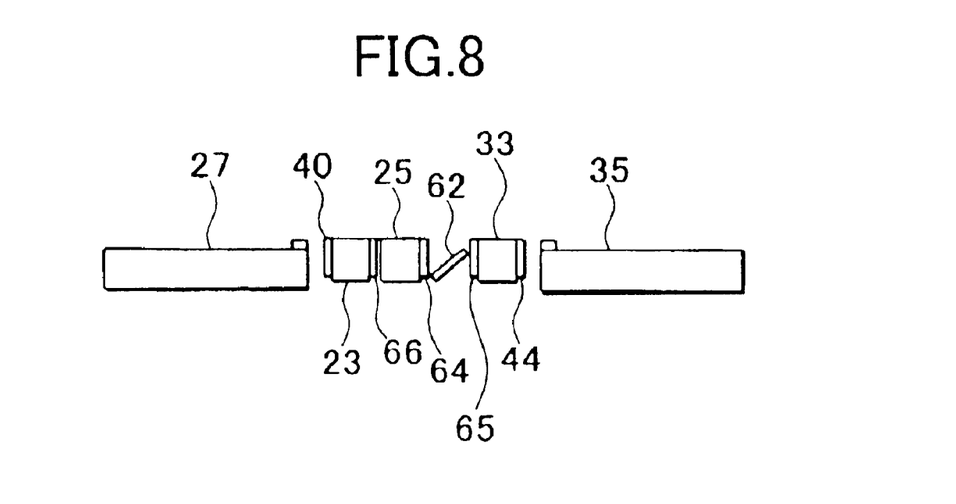
FIG. 8 is a schematical frontal view of an essential portion of the sixth embodiment of the invention.

FIG. 7 and FIG. 8 each represents a sixth embodiment of the present invention. The reflection surfaces as explained in the fifth embodiment are directly formed on the first solid-state laser medium 23, the optical member 25 for wavelength conversion, and the second solid-state laser medium 33, and the reflection mirror 60 for the second resonator and the reflection mirror 61 for the first resonator are omitted. In FIG. 7 and FIG. 8, the same component as shown in FIG. 4 is referred by the same symbol.

A first solid-state laser medium 23 is positioned to face to an LD light emitter 27 on the same optical axis, and an optical crystal 25 for wavelength conversion is positioned adjacent to the first solid-state laser medium 23. A wavelength separating plate 62 for output is placed between the optical crystal 25 and a second solid-state laser medium 33, and an LD light emitter 35 is positioned to face to the second solid-state laser medium 33.

On a surface of the first solid-state laser medium 23 facing to the LD light emitter 27, a dielectric reflection film 40 is formed, which is highly transmissive to an excitation light $\lambda$ and is highly reflective to the first fundamental wave $\lambda 1$. On a surface opposite to the surface facing to the LD light emitter 27 of the first solid-state laser medium 23, a dielectric reflection film 66 is formed, which is highly transmissive to the first fundamental wave $\lambda 1$ and is highly reflective to the second fundamental wave $\lambda 2$ and the wavelength conversion light $\lambda 3$. The dielectric reflection film 66 may be formed on a surface of the optical crystal 25 for wavelength conversion facing to the first solid-state laser medium 23.

On a surface of the optical crystal 25 for wavelength conversion facing to the wavelength separating plate 62 for output, a film 64 is formed, and the film 64 is highly transmissive to the first fundamental wave λ1, the second fundamental wave λ2 and the wavelength conversion light λ3. Also, the wavelength separating plate 62 for output is highly transmissive to the first fundamental wave λ1 and the second fundamental wave λ2 and it is highly reflective to the wavelength conversion light λ3. On a surface of the second solid-state laser medium 33 facing to the wavelength conversion plate 62 for output, a dielectric reflection film 65 is formed. A dielectric reflection film 44 is formed on a surface facing to the LD light emitter 35. The dielectric reflection film 65 is highly transmissive to the second fundamental wave λ2 and is highly reflective to the first fundamental wave λ1. The dielectric reflection film 44 is highly transmissive to the excitation light λ and is highly reflective to the second fundamental wave λ2.

A first resonator is made up between the dielectric reflection film 40 and the dielectric reflection film 65, and a second resonator is made up between the dielectric reflection film 44 and the dielectric reflection film 66.

The operation in the sixth embodiment is the same as the operation of the first embodiment explained in connection with FIG. 1, and description is not given here. In the sixth embodiment, the first concave mirror 22, the second concave mirror 32, the reflection mirror 24 for the second resonator, and the reflection mirror 26 for the first resonator are omitted, and this makes it possible to design the solid-state laser device in more compact size.

When the first solid-state laser medium 23 is positioned adjacent to the optical crystal 25 for wavelength conversion, and if a film is formed by vapor deposition on any one of the first solid-state laser medium 23 and the optical crystal 25 for wavelength conversion, e.g., around the optical crystal 25 for wavelength conversion, it is possible to form an optical gap between the optical crystal 25 for wavelength conversion and the first solid-state laser medium 23 even when the first solid-state laser medium 23 is closely fitted to the optical crystal 25 for wavelength conversion.

A solid-state laser device according to the present invention comprises a first resonator arranged on a first optical axis, a second resonator arranged on a second optical axis, a first light emitter for entering an excitation light to the first resonator, a second light emitter for entering an excitation light to the second resonator, and further comprises a separated optical axis portion serving as a part of the first optical axis, a separated optical axis portion serving as a part of the second optical axis, a common optical axis portion where the first optical axis and the second optical axis are superimposed, a first solid-state laser medium arranged on the separated optical axis portion of the first optical axis, a second solid-state laser medium arranged on the separated optical axis portion of the second optical axis, and an optical member for wavelength conversion and wavelength switching means arranged on the common optical axis portion, wherein the optical member for wavelength conversion comprises a plurality of optical crystals for wavelength conversion having different conversion frequencies, and the wavelength switching means can change the optical crystals for wavelength conversion where a laser beam enters. As a result, the device can project laser beams with a plurality of wavelengths. The device can enter the excitation light independently to the first resonator and the second resonator, and higher output can be obtained. Because the optical axis of the first resonator is separated from the optical axis of the second resonator, the matching of optical axes of two wavelengths can be performed much easier.

The first solid-state laser medium and the second solid-state laser medium are provided on converging points of the excitation light on the separated optical axis portions of the first resonator and the second resonator respectively. As a result, it is possible to perform excitation with high efficiency, and the matching of optical axes can be made much easier. Beam waists of each fundamental wave are formed on a common portion shared by the first resonator and the second resonator. By arranging the optical crystal for wavelength conversion, frequency conversion can be carried out with high efficiency.

What is claimed is:

1. A solid-state laser device, comprising a first optical axis, a second optical axis crossing said first optical axis, a first resonator arranged on said first optical axis and for oscillating a first fundamental wave between a first concave mirror and a plane output mirror, a second resonator arranged on said second optical axis and for oscillating a second fundamental wave between a second concave mirror and said plane output mirror, a first light emitter for entering an excitation light to said first resonator, a second light emitter for entering an excitation light to said second resonator, a wavelength separating plate arranged on a portion where said first optical axis crosses said second optical axis and for deflecting said second optical axis so as to form a common optical axis portion which is commonly used by said first optical axis and said second optical axis, an optical member for wavelength conversion arranged between said plane output mirror and said wavelength separating plate, and a wavelength switching means capable of inserting or removing said optical member for wavelength conversion with respect to said common optical axis portion, wherein said output plane mirror is arranged on said common optical axis portion and is commonly used by said first resonator and said second resonator, said wavelength separating plate transmits the first fundamental wave, and reflects the second fundamental wave on said common optical axis portion, said optical member for wavelength conversion comprises a plurality of optical crystals for wavelength conversion, and said wavelength switching means selectively inserts said optical crystals for wavelength conversion in said common optical axis portion.

2. A solid-state laser device according to claim 1, wherein said first resonator oscillates the fundamental wave λ1 where curvature of a reflection surface of said first concave mirror is R1 and a distance between said first concave mirror and said plane output mirror is L1, and said second resonator oscillates a second fundamental wave λ2 where curvature of a reflection surface of said second concave mirror is R2 and a distance between said second concave mirror and said plane output mirror is L2, said first resonator and said second resonator have a relation of $\lambda1^2 L1(R1-L1)=\lambda2^2(R2-L2)$, and a beam waist of said fundamental wave of said first resonator and a beam waist of said fundamental wave of said second resonator are formed on said optical member for wavelength conversion.

3. A solid-state laser device according to claim 1, wherein said first light emitter for entering the excitation light to said first resonator and said second light emitter for entering said eXcitation light to the second resonator can be driven independently from each other.

4. A solid-state laser device according to claim 1, wherein an intermediate mirror which is highly reflective to a wavelength conversion light is provided between said wavelength separating plate and said optical member for wavelength conversion.

5. A solid-state laser device according to claim 1, wherein each of said first concave mirror of said first resonator and said second concave mirror of said second resonator has a radius of curvature so as to set a beam waist on said optical member for wavelength conversion.

* * * * *